(12) United States Patent
Lee et al.

(10) Patent No.: US 12,504,179 B2
(45) Date of Patent: Dec. 23, 2025

(54) AIR CONDITIONER

(71) Applicant: LG ELECTRONICS INC., Seoul (KR)

(72) Inventors: Keonwang Lee, Seoul (KR); Hyungho Park, Seoul (KR); Namgyu Shin, Seoul (KR); Giseop Lee, Seoul (KR)

(73) Assignee: LG ELECTRONIS INC., Seoul (KR)

( * ) Notice: Subject to any disclaimer, the term of this patent is extended or adjusted under 35 U.S.C. 154(b) by 405 days.

(21) Appl. No.: 18/018,330

(22) PCT Filed: Jul. 23, 2021

(86) PCT No.: PCT/KR2021/009525
§ 371 (c)(1),
(2) Date: Jan. 27, 2023

(87) PCT Pub. No.: WO2022/025530
PCT Pub. Date: Feb. 3, 2022

(65) Prior Publication Data
US 2023/0272925 A1    Aug. 31, 2023

(30) Foreign Application Priority Data
Jul. 30, 2020   (KR) .................... 10-2020-0094895

(51) Int. Cl.
*F24F 1/00*      (2019.01)
*F24F 1/0076*    (2019.01)
*F24F 8/192*     (2021.01)

(52) U.S. Cl.
CPC ............ *F24F 1/0076* (2019.02); *F24F 8/194* (2021.01)

(58) Field of Classification Search
CPC ..... B03C 3/38; B03C 3/41; B03C 3/66; F24F 1/00; F24F 13/20; F24F 3/16
See application file for complete search history.

(56) References Cited

U.S. PATENT DOCUMENTS

| 6,506,238 B1 | 1/2003 | Endo |
| 2018/0200728 A1 | 7/2018 | Pourprix et al. |

FOREIGN PATENT DOCUMENTS

| DE | 2222693 | 12/1983 |
| DE | 112021001621 | 1/2023 |

(Continued)

OTHER PUBLICATIONS

Lee KR Patent (Year: 2018).*

(Continued)

*Primary Examiner* — Sharon Pregler
(74) *Attorney, Agent, or Firm* — KED & ASSOCIATES (57) ABSTRACT

An air conditioner that may include a case that forms an exterior thereof; a panel having an air inlet and disposed at one side of the case; an electric dust collector that collects foreign substances introduced through the air inlet; and a high voltage applying device electrically connected to the electric dust collector. The electric dust collector includes a discharge electrode that extends toward the air inlet and charges particles contained in air introduced through the air inlet, and an electrode holder that supports the discharge electrode so that an angle formed between an extension direction of the discharge electrode and a flow direction of air introduced through the air inlet may be changed, such that distribution of an ion field may be adjusted by adjusting the angle between the discharge electrode and the flow direction.

14 Claims, 10 Drawing Sheets

(56) References Cited

FOREIGN PATENT DOCUMENTS

| | | |
|---|---|---|
| JP | 2001-137741 | 5/2001 |
| JP | 2014-105969 | 6/2014 |
| KR | 10-2010-0082639 | 7/2010 |
| KR | 10-2017-0136246 | 12/2017 |
| KR | 101816568 B1 * | 1/2018 |
| KR | 10-2018-0065711 | 6/2018 |
| KR | 10-2019-0134362 | 12/2019 |

OTHER PUBLICATIONS

Korean Office Action issued in Application No. 10-2020-0094895 dated Dec. 11, 2024.
German Office Action dated Sep. 25, 2023 issued in Application No. 112021004032.4.
International Search Report (with English Translation) dated Nov. 5, 2021 issued in Application No. PCT/KR2021/009525.

* cited by examiner

| Classification | Charging portion Voltage(kV) | Angle | Ion field distribution |
|---|---|---|---|
| A | 7.7 | | |
| B | 7.7 | | |
| C | 6 | | |

FIG. 11

AIR CONDITIONER

CROSS-REFERENCE TO RELATED PATENT APPLICATIONS

This application is a U.S. National Stage Application under 35 U.S.C. § 371 of PCT Application No. PCT/KR2021/009525, filed Jul. 23, 2021, which claims priority to Korean Patent Application No. 10-2020-0094895, filed Jul. 30, 2020, whose entire disclosures are hereby incorporated by reference.

TECHNICAL FIELD

The present invention relates to an air conditioner, and more particularly, to a discharge electrode of a dust collecting filter.

BACKGROUND ART

An air conditioner is a device that sucks indoor air, balances the temperature and humidity or air quality of the sucked air, and then supplies the conditioned air to the room.

In order to remove foreign substances contained in air sucked into an indoor unit of an air conditioner, an electric dust collecting filter is disposed on a suction side of the indoor unit. The electric dust collecting filter collects the polarized foreign substances through an electric field by charging the molecules included in the inflowing air so that the molecules adhere to the foreign substances.

A discharge electrode is disposed in the electric dust collecting filter. The discharge electrode receives a high voltage to charge molecules included in the flowing air through corona discharge. Discharge electrodes are arranged parallel to the flow direction to maximize charging efficiency.

However, an excessive amount of molecules compared to the amount of introduced foreign substances is ionized by the discharge electrodes arranged parallel to the flow direction, resulting in the generation of residual ions. The residual ions adhere to the anode plate of the dust collecting filter and reduce the dust collection efficiency.

Korean Publication No. 10-2017-0136246 discloses that discharge electrodes disposed upstream of the dust collecting filter are disposed parallel to the flow direction, and charging efficiency can be increased as the discharge electrodes are disposed parallel to the flow direction. However, there was a problem that the ultimate dust collecting efficiency was lowered.

DISCLOSURE

Technical Problem

An object to be solved by the present invention is to provide an air conditioner capable of adjusting the distribution of ion fields.

Another object of the present invention is to provide an air conditioner in which the angle of the discharge electrode can be easily adjusted.

Another object of the present invention is to provide an air conditioner in which discharge electrodes can be easily attached or detached.

Another object of the present invention is to provide an air conditioner stably supporting the discharge electrode.

Another object of the present invention is to provide an air conditioner with improved dust collecting efficiency of an electric dust collector.

The objects of the present invention are not limited to the objects mentioned above, and other objects not mentioned will be clearly understood by those skilled in the art from the following description.

Technical Solution

In order to achieve the above object, the air conditioner according to an embodiment of the present invention may include, a case forming the exterior; a panel having an air inlet and disposed at one side of the case; an electric dust collector for collecting foreign substances introduced through the air inlet; and a high voltage applying device electrically connected to the electric dust collector, wherein the electric dust collector includes: a discharge electrode extending toward the air inlet and charging particles contained in air introduced through the air inlet; and an electrode holder supporting the discharge electrode so that an angle formed between an extension direction of the discharge electrode and a flow direction of air introduced through the air inlet can be changed. Accordingly, there is an advantage in that the distribution of the ion field can be adjusted by adjusting the angle between the discharge electrode and the flow direction.

The discharge may electrode obliquely extend outward from the panel.

The electrode holder may be open toward the air inlet and has an electrode groove in which the discharge electrode is accommodated.

The electrode holder may have a keyhole into which the discharge electrode is inserted.

The electrode holder may have a valley formed in a direction crossing the extending direction of the discharge electrode.

The electrode holder may comprise: an electrode body in which the discharge electrode is accommodated; and a leg connected to the upper side of the electrode body.

The electrode holder may include a leg tip connected to an upper side of the leg.

The leg may protrude outward as it goes upward.

The discharge electrode may comprise: a needle receiving a high voltage from the high voltage applying device; and a key supporting the needle.

The electric dust collector may include an electrode cap connected to the electrode holder and supporting the discharge electrode.

The electrode cap may have a fence protruding outward from the electrode holder.

The electric dust collector may include a holder case in which the electrode holder is seated.

The electric dust collector may comprise: a dust collecting unit for collecting foreign substances introduced through the air inlet; and a seating frame disposed outside the dust collecting unit and supporting the holder case.

The holder case may comprise: a receiving body at least a part of which protrudes toward the panel; and a support body connected to the receiving body.

The holder case may have a crest inserted into a valley formed on one side of the electrode holder.

Details of other embodiments are included in the detailed description and drawings.

Advantageous Effects

According to the air conditioner of the present invention, there are one or more of the following effects.

First, the ion field distribution may be controlled by adjusting an angle between a discharge electrode and a flow direction.

Second, as an electrode holder for supporting a discharge electrode is provided, an angle of the discharge electrode may be easily adjusted.

Third, a holder case in which an electrode holder is accommodated may be easily attached to and detached from an electric dust collector.

Fourth, as a discharge electrode is double fixed by an electrode holder and a holder case, the discharge electrode may be securely supported.

Fifth, as the ion field distribution is controlled to reduce the amount of residual ions, the efficiency of dust collection of an electric dust collector may be improved.

The effects of the present invention are not limited to the effects mentioned above, and other effects not mentioned will be clearly understood by those skilled in the art from the description of the claims.

DESCRIPTION OF DRAWINGS

FIG. 9(*a*) is a cross-sectional view of an electrode holder according to an embodiment of the present invention.

FIG. 9(*b*) is a rear perspective view of an electrode holder according to an embodiment of the present invention.

BEST MODE

Advantages and features of the present invention, and methods of achieving them, will become clear with reference to the embodiments described below in detail in conjunction with the accompanying drawings. However, the present invention is not limited to the embodiments disclosed below and may be implemented in various different forms, only the present embodiments make the disclosure of the present invention complete, and it is provided to completely inform the skilled in the art the scope of the present invention, and the present invention is only defined by the scope of the claims. same reference numbers designate same elements throughout the specification.

Hereinafter, the present invention will be described with reference to drawings for explaining an air conditioner according to embodiments of the present invention.

Figure 1:
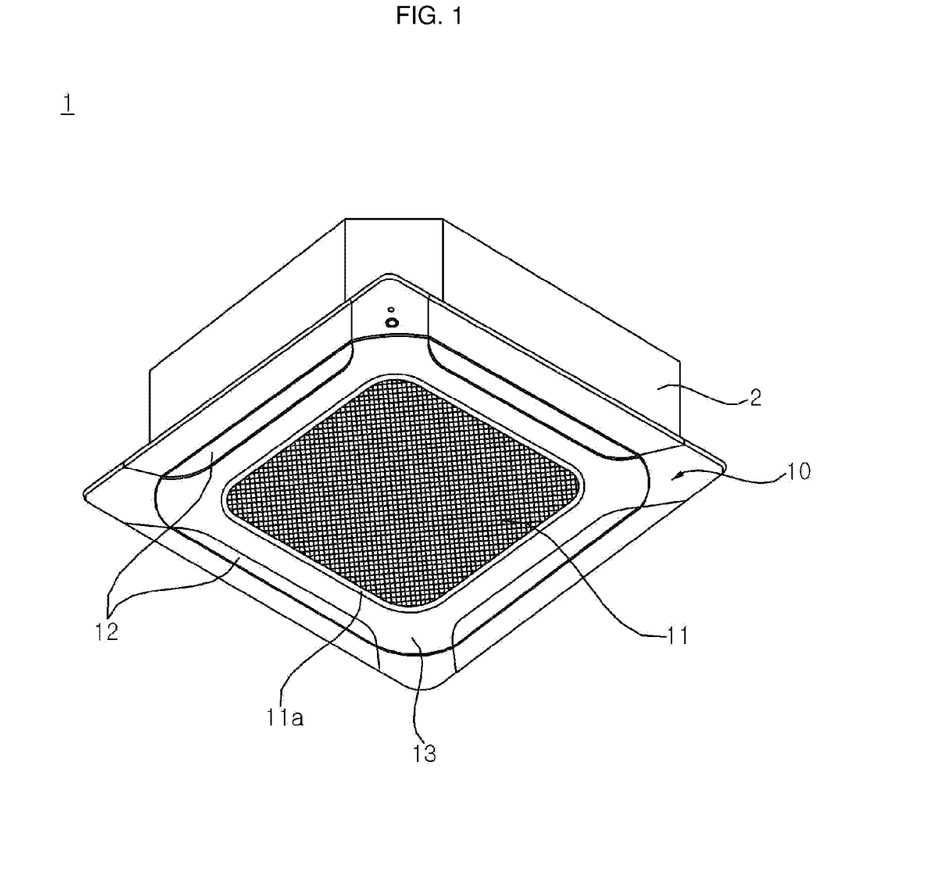
FIG. 1 is a perspective view of an indoor unit for an air conditioner according to an embodiment of the present invention.
Figure 2:
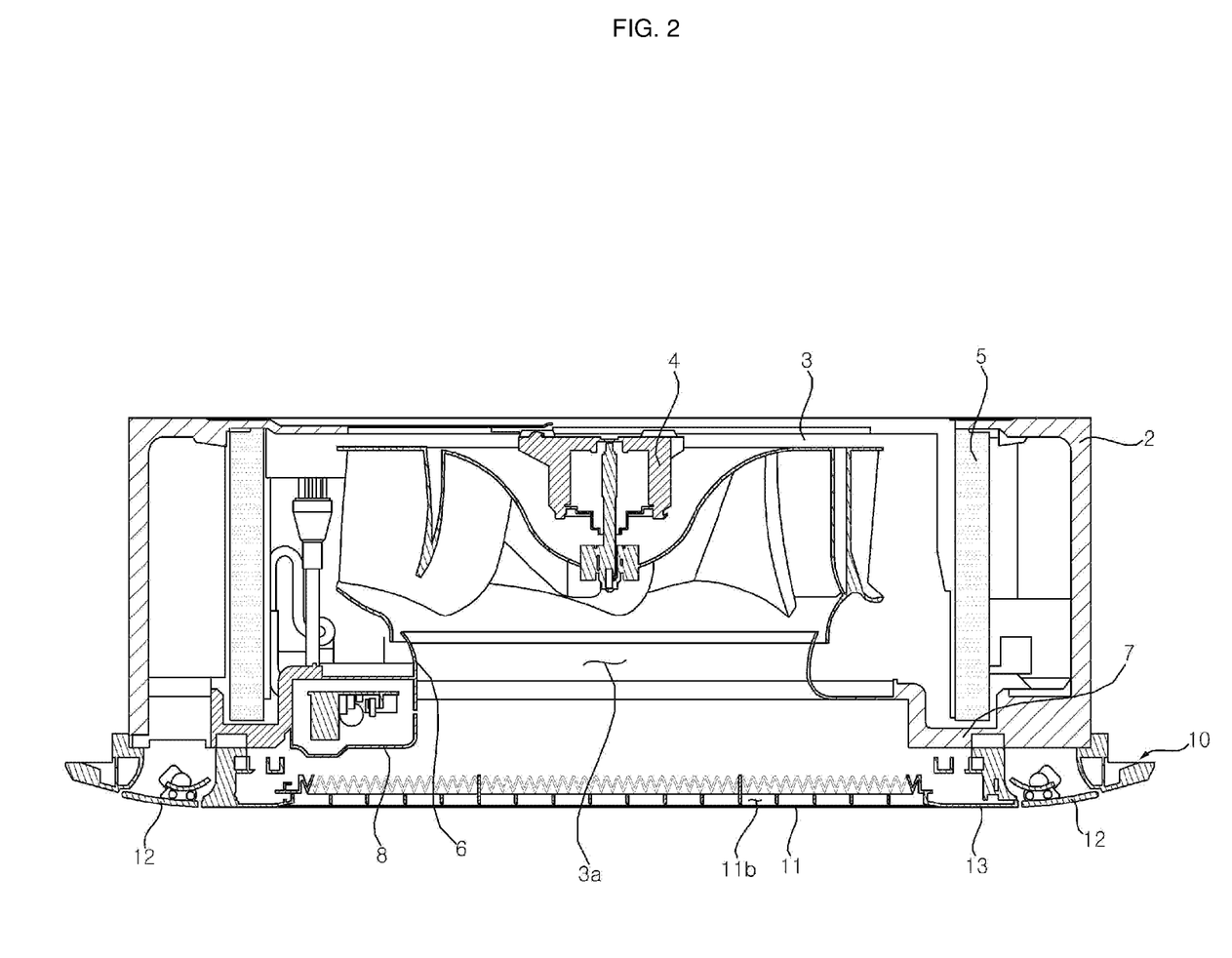
FIG. 2 is a longitudinal cross-sectional view of an indoor unit of an air conditioner according to an embodiment of the present invention.

Referring to FIGS. 1 and 2, the overall structure of the indoor unit 1 will be described first. FIG. 1 shows an indoor unit 1 viewed obliquely from the lower side, and FIG. 2 schematically shows part of the internal structure of the indoor unit 1 by cutting it open.

The indoor unit 1 may include cases 2 and 10 forming an exterior. The cases 2 and 10 may include an upper case 2 connected to the ceiling surface of the room. The cases 2 and 10 may include a panel 10 disposed below the upper case 2 and connected to the upper case 2.

The overall appearance of the upper case 2 may be a square columnar shape, and an upper end portion may be fixed to the ceiling surface of the room.

At the lower side of the upper case 2, an air inlet 11*b* is formed and a panel 10 connected to the lower portion of the upper case 2 is disposed. The overall appearance of the panel 10 may be a rectangular plate shape, and may protrude outward from the upper case 2. Accordingly, an area surrounded by the outer circumferential surface of the panel 10 may be larger than an area surrounded by the outer circumferential surface of the upper case 2.

The panel 10 may include a suction grill 11 forming an air inlet 11*b*, and the suction grill 11 may be disposed inside the panel 10. The air inlet 11*b* may be understood as a flow passage formed by the suction grill 11 between the upper case 2 and the outside of the indoor unit 1.

The suction grill 11 may be formed in a mesh shape, and a rectangular grill frame 11*a* may form an edge of the suction grill 11. A discharge vane 12 through which air introduced through the air inlet 11*b* is discharged to the outside of the indoor unit 1 is formed outside the suction grill 11.

A plurality of discharge vanes 12 may be formed outside the panel 10 and may be formed adjacent to each of the four sides of the rectangular panel 10. The discharge vane 12 is rotatably connected to the panel 10, and an air outlet may be formed between the panel 10 and the discharge vane 12 through rotation. The discharge vane 12 may be formed outside the panel 10 rather than the grill frame 11*a*, and may be formed parallel to each of the four circumferential sides of the grill frame 11*a*.

A base plate 13 forming a lower surface of the panel 10 may be disposed between the grill frame 11*a* and the discharge vane 12. The base plate 13 may connect the suction grill 11 and the discharge vane 12.

The air introduced into the indoor unit 1 through the suction grill 11 may be discharged to the outside of the indoor unit 1 through the discharge vane 12 after undergoing a series of cleaning operations within the indoor unit 1.

Air introduced into the indoor unit 1 through the intake grill 11 may flow toward the blowing fan 3 through the fan inlet 3*a*. The blowing fan 3 may be connected to and rotated with a fan motor 4 disposed above the blowing fan 3. The blowing fan 3 may blow air introduced into the indoor unit 1 by rotation toward the discharge vane 12.

In order to guide the air introduced through the suction grill 11 toward the blowing fan 3, a bell mouth 6 may be formed below the blowing fan 3. The bell mouth 6 may be curved and extended outward toward the upper side.

A heat exchanger 5 may be disposed outside the blowing fan 3 to exchange heat between the blown air and the refrigerant. The heat exchanger 5 is connected to an outdoor unit (not shown) through a refrigerant pipe (not shown), and can exchange heat between the supplied refrigerant and flowing air. Two heat exchangers 5 may be spaced apart from each other on both sides of the blowing fan 3, and each may have the same form and function.

A drain pan 7 in which condensed water condensed in the heat exchanger 5 is collected may be disposed below the heat exchanger 5. The drain pan 7 can drain condensed water to the outside of the indoor unit 1.

A high voltage applying device 8 may be disposed between the bell mouth 6 and the heat exchanger 5, and the high voltage applying device 8 is electrically connected to the fan motor 4 and an electric dust collector 20 to be described later. Thus, power can be supplied to the fan motor 4 and the electric dust collector 20.

Air introduced into the indoor unit 1 through the suction grill 11 may be guided in a flow direction by the bell mouth 6 and flow toward the blowing fan 3 through the fan inlet 3a. The blowing fan 3 may blow the introduced air toward the discharge grill 12. The blown air may be discharged to the outside of the indoor unit 1 through the discharge grill 12 in a cooled or heated state through the heat exchanger 5.

Figure 3:
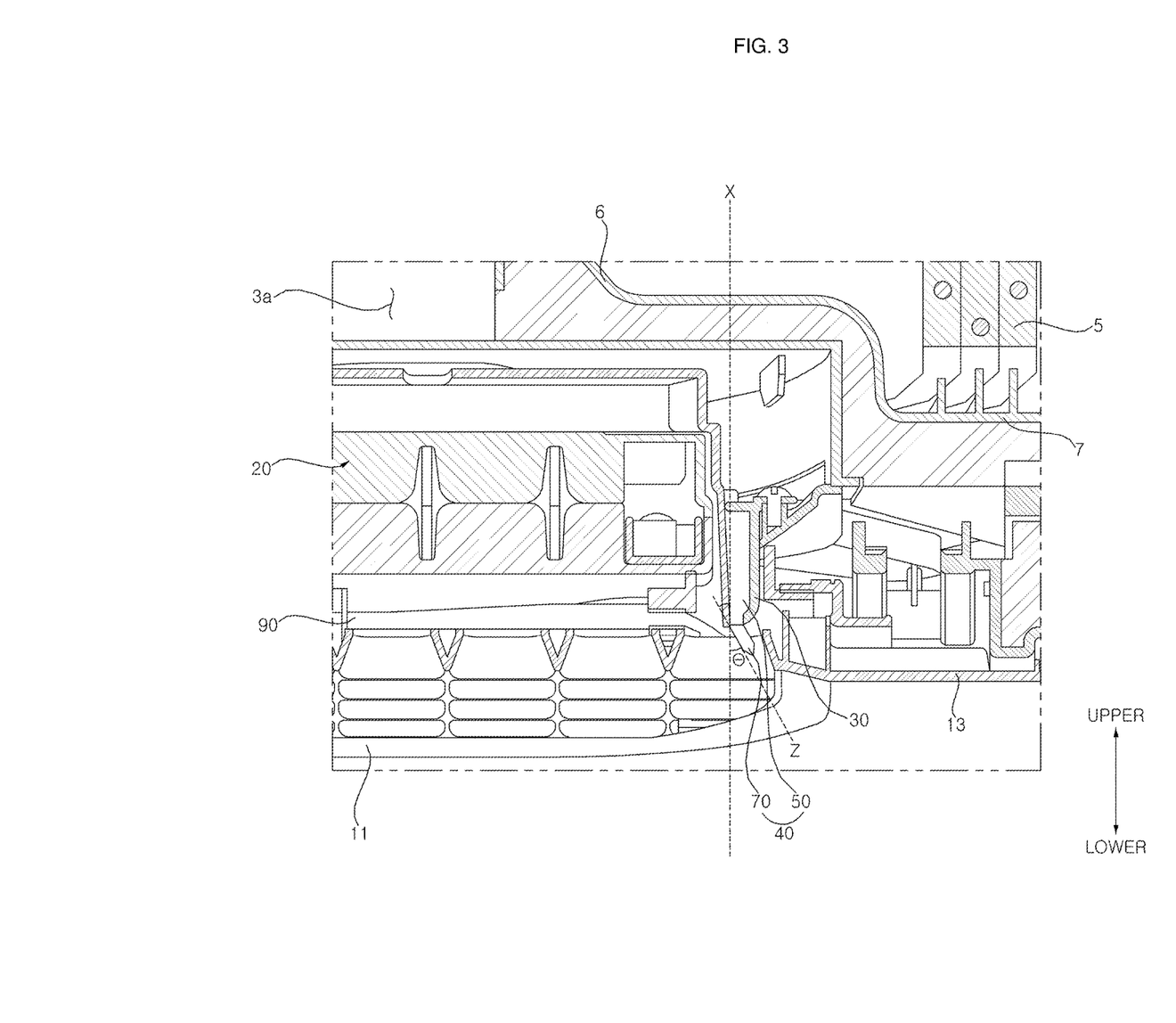
FIG. 3 is an enlarged view of a part of an indoor unit of an air conditioner according to an embodiment of the present invention.

Hereinafter, the arrangement position and structure of the electric dust collector 20 will be described with reference to FIG. 3. FIG. 3 is an enlarged view of a partial area inside the indoor unit 1, in order to show the arrangement positions and structure of the electric dust collector 20, the seating frame 30, the holder case 50, and the discharge electrodes 70.

The electric dust collector 20 for collecting foreign substances introduced through the air inlet 11b is disposed on the upper side of the suction grill 11. The electric dust collector 20 may be disposed between the suction grill 11 and the fan inlet 3a, and may be disposed below the bell mouth 6. The electric dust collector 20 may be electrically connected to the high voltage applying device 8 and may receive a high voltage from the high voltage applying device 8.

A pre-filter 90 may be disposed between the electric dust collector 20 and the suction grill 11. The pre-filter 90 may have a mesh shape. The pre-filter 90 may filter out foreign substances contained in the air introduced through the air inlet 11b.

The electric dust collector 20 may include a charging device 40 that charges particles contained in air introduced through the air inlet 11b. The electric dust collector 20 may include a seating frame 30 supporting the charging device 40. The charging device 40 and the seating frame 30 may be located outside the electric dust collector 20.

The charging device 40 may include a holder case 50 connected to the seating frame 30. The charging device 40 is supported by the holder case 50 and may include a discharge electrode 70 that charges particles contained in air introduced through the air inlet 11b.

The discharge electrode 70 may be formed to extend toward the air inlet 11b and at least partially protrude from the air inlet 11b. The discharge electrode 70 may extend outward with a predetermined inclination angle θ with the direction in which the air inlet 11b is opened. The air inlet 11b may be opened in a vertical direction, and thus the discharge electrode 70 may have a predetermined inclination angle θ with respect to the vertical axis.

Specifically, a line parallel to the upper and lower axes is defined as a first line X, and a line parallel to the direction in which the discharge electrode 70 extends is defined as a second line Z. The first line X may be parallel to the flow direction of the air introduced through the air inlet 11b, and the air introduced therein may be introduced upward and flow toward the blowing fan 3. The second line Z may be formed to have a predetermined inclination angle θ with the first line X. Accordingly, the discharge electrode 70 may be inclinedly extended outward from the panel 10 to have a predetermined inclination angle θ with the flow direction X of the introduced air. In addition, the discharge electrode 70 may have a predetermined inclination angle θ with the flow direction X of the introduced air.

An angle θ formed between the extension direction Z of the discharge electrode 70 and the flow direction X of the air introduced through the air inlet 11b may be changed.

Figure 4:
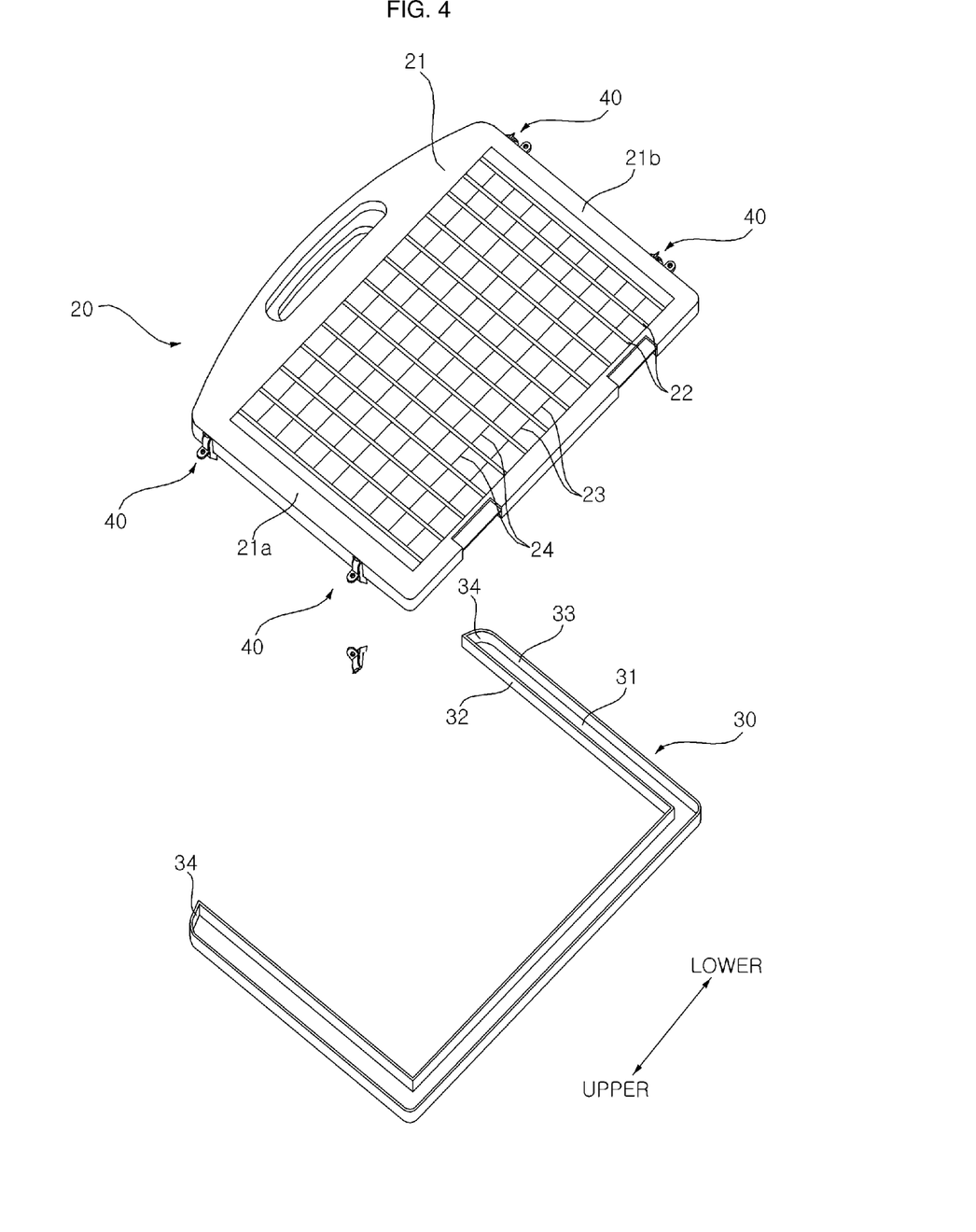
FIG. 4 is a perspective view of an electric dust collector according to an embodiment of the present invention.

Hereinafter, with reference to FIG. 4, the structure of the electric dust collector 20 and the method for collecting foreign substances will be described. FIG. 4 shows a form in which the electric dust collector 20 is obliquely viewed from above. FIGS. 4 to 9 show a form shown by turning the structure upside down for convenience of configuration description.

The electric dust collector 20 may include a dust collecting frame 21 forming an outer shape of the electric dust collector 20. The electric dust collector 20 may include a charging device 40 that charges particles contained in the introduced air. The electric dust collector 20 may include a seating frame 30 supporting the charging device 40.

The overall appearance of the dust collecting frame 21 may be a square column shape with an empty inner side, and the outline shape may be a frame shape. The dust collecting frame 21 may have a quadrangular closed loop shape surrounded on all sides. The dust collecting frame 21 may include a first frame 21a disposed on one side and a second frame 21b disposed opposite to the first frame 21a on the other side. The first frame 21a and the second frame 21b may have a rectangular pillar shape and may be arranged side by side with each other. The inside of the first frame 21a and the second frame 21b may be hollow. A wire (not shown) connected to the high voltage applying device 8 may extend into the inner space of the first frame 21a and the second frame 21b.

The dust collecting frame 21 may include a plurality of partition walls 22 extending parallel to the first frame 21a and the second frame 21b and spaced apart from each other inside the dust collecting frame 21. The plurality of partition walls 22 may be formed to be spaced apart from each other in a direction crossing the extension direction of the partition wall 22 between the first frame 21a and the second frame 21b. The inside of the partition wall 22 may be hollow, and a wire (not shown) connected to the high voltage applying device 8 may extend into the inner space of the partition wall 22.

The dust collecting frame 21 may include a high voltage electrode 23 disposed between the plurality of partition walls 22. The dust collecting frame 21 may include a ground electrode 24 disposed between the plurality of partition walls 22. A plurality of high voltage electrodes 23 and ground electrodes 24 may be alternately arranged or may be arranged side by side with each other. The high voltage electrode 23 and the ground electrode 24 may constitute an electrical circuit through a wire (not shown) connected to the high voltage applying device 8. The high voltage electrode 23 and the ground electrode 24 have electrical polarities opposite to each other, and thus an electric field is formed between the high voltage electrode 23 and the ground electrode 24. Particles ionized by the corona discharge of the charging device 40 may have a positive or negative polarity. When the ionized particles pass between the high voltage electrode 23 and the ground electrode 24, they may be attached to and collected by the electrodes 23 and 24 having opposite polarities.

Each of the plurality of high voltage electrodes 23 and the ground electrode 24 may be integrally formed. Each of the plurality of high voltage electrodes 23 and the ground electrode 24 penetrates through the plurality of partition walls 22, and has one end connected to the first frame 21*a* and the other end connected to the second frame 21*b*. In addition, each of the plurality of high voltage electrodes 23 and the ground electrode 24 may extend between the pair of partition walls 22 and be connected to each of the pair of partition walls 22.

The dust collecting frame 21, the partition wall 22, the high voltage electrode 23, and the ground electrode 24 may be referred to as a "dust collecting unit" in which foreign substances introduced through the air inlet 11*b* are collected. The dust collecting frame 21, the partition wall 22, the high voltage electrode 23, and the ground electrode 24 may be sub-elements of the dust collecting unit.

Outside the dust collecting frame 21, a charging device 40 for charging the introduced air is disposed. A plurality of charging devices 40 may be disposed spaced apart from each other, and each charging device 40 may be connected to the first frame 21*a* or the second frame 21*b*. Two charging devices 40 may be connected to each of the first frame 21*a* and the second frame 21*b*. The two charging devices 40 connected to the frames 21*a* and 21*b* may be spaced apart from each other in the extension direction of the frames 21*a* and 21*b*.

Each of the plurality of charging devices 40 may be detachably connected to the dust collecting frame 21 and may be separated from the dust collecting frame 22 independently. The charging device 40 may be electrically connected to a wire (not shown) extending from the high voltage applying device 8. The wire (not shown) may extend along the inner space of the frames 21*a* and 21*b* and be electrically connected to each charging device 40.

Each of the plurality of charging devices 40 may be connected to a seating frame 30 connected to the dust collecting frame 21. The seating frame 30 may be disposed to surround an outer circumferential surface of the dust collecting frame 21 and may be detachably connected to the dust collecting frame 21.

The overall appearance of the seating frame 30 may be 'c'-shaped, and an accommodation space for the charging device 40 may be formed on the inside.

The seating frame 30 may include a seating frame base 31 forming an upper surface of the seating frame 30. The seating frame 30 may include a seating frame inner wall 32 extending downward from the inside of the seating frame base 31. The seating frame 30 extends downward from the outside of the seating frame base 31 and may include a seating frame outer wall 33 spaced apart from the seating frame inner wall 32. The seating frame 30 may include a seating frame edge 34 connecting the seating frame inner wall 32 and the seating frame outer wall 33 and forming an end of the seating frame 30.

The seating frame inner wall 32 may be connected to the dust collecting frame 21 through a predetermined fastening member while being in contact with the outer circumferential surface of the dust collecting frame 21. The seating frame inner wall 32 may be connected to each of the first frame 21*a* and the second frame 21*b*.

Figure 5:
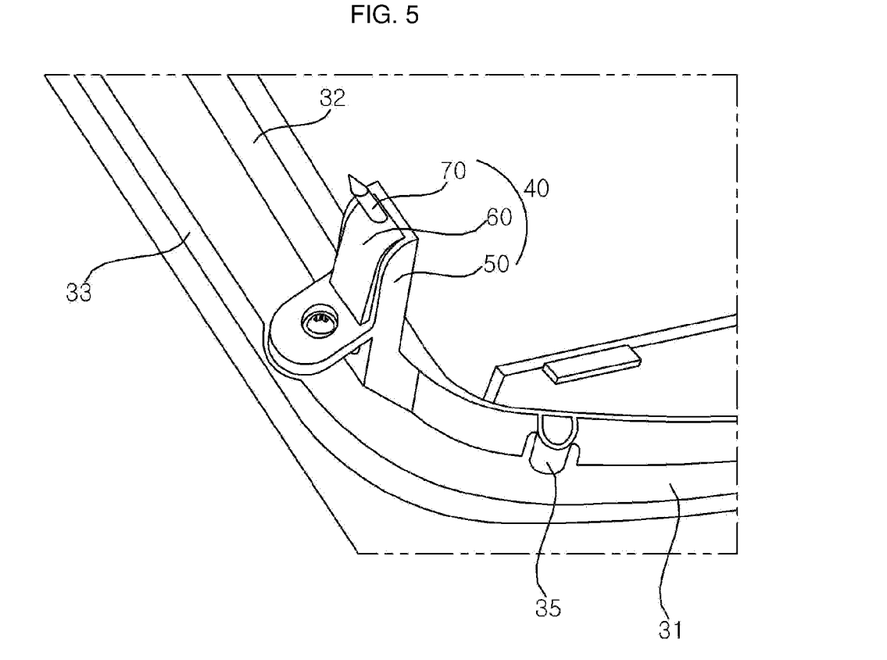
FIG. 5 is a diagram illustrating a coupling structure of a seating frame and a charging device according to an embodiment of the present invention.

Hereinafter, a structure in which the seating frame 30 supports the charging device 40 will be described with reference to FIG. 5. FIG. 5 is an enlarged view of the charging device 40 disposed on the seating frame 30.

The charging device 40 may be disposed between the seating frame inner wall 32 and the seating frame outer wall 33, and may be supported by the seating frame base 31. The charging device 40 may be connected to each of the seating frame inner wall 32 and the seating frame base 31 through predetermined fastening members.

Fasteners 35 opened up and down may be formed in the seating frame 30. The seating frame 30 may be fixed to the dust collecting frame 21 or the bell mouth 6 through a predetermined fastening member penetrating the fastener 35.

The charging device 40 may include a discharge electrode 70 that generates a corona discharge by receiving a high voltage. The charging device 40 may include an electrode holder 60 supporting the discharge electrode 70. The charging device 40 may include a holder case 50 accommodating the electrode holder 60.

The holder case 50 may be connected to the seating frame 30 through a predetermined fastening member, and may be connected to the seating frame base 31 and the seating frame inner wall 32, respectively.

Figure 6:
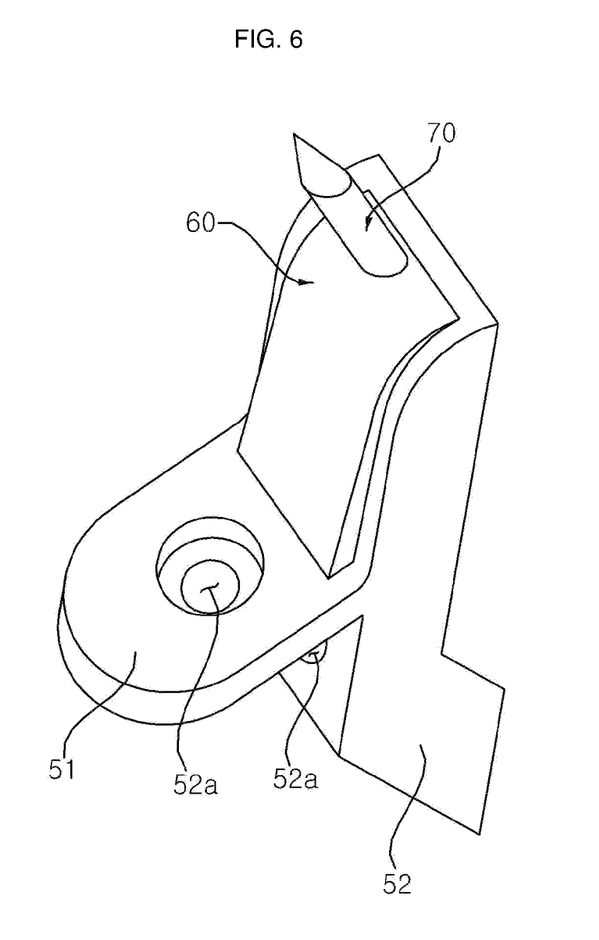
FIG. 6 is a perspective view of a charging device according to an embodiment of the present invention.
Figure 7:
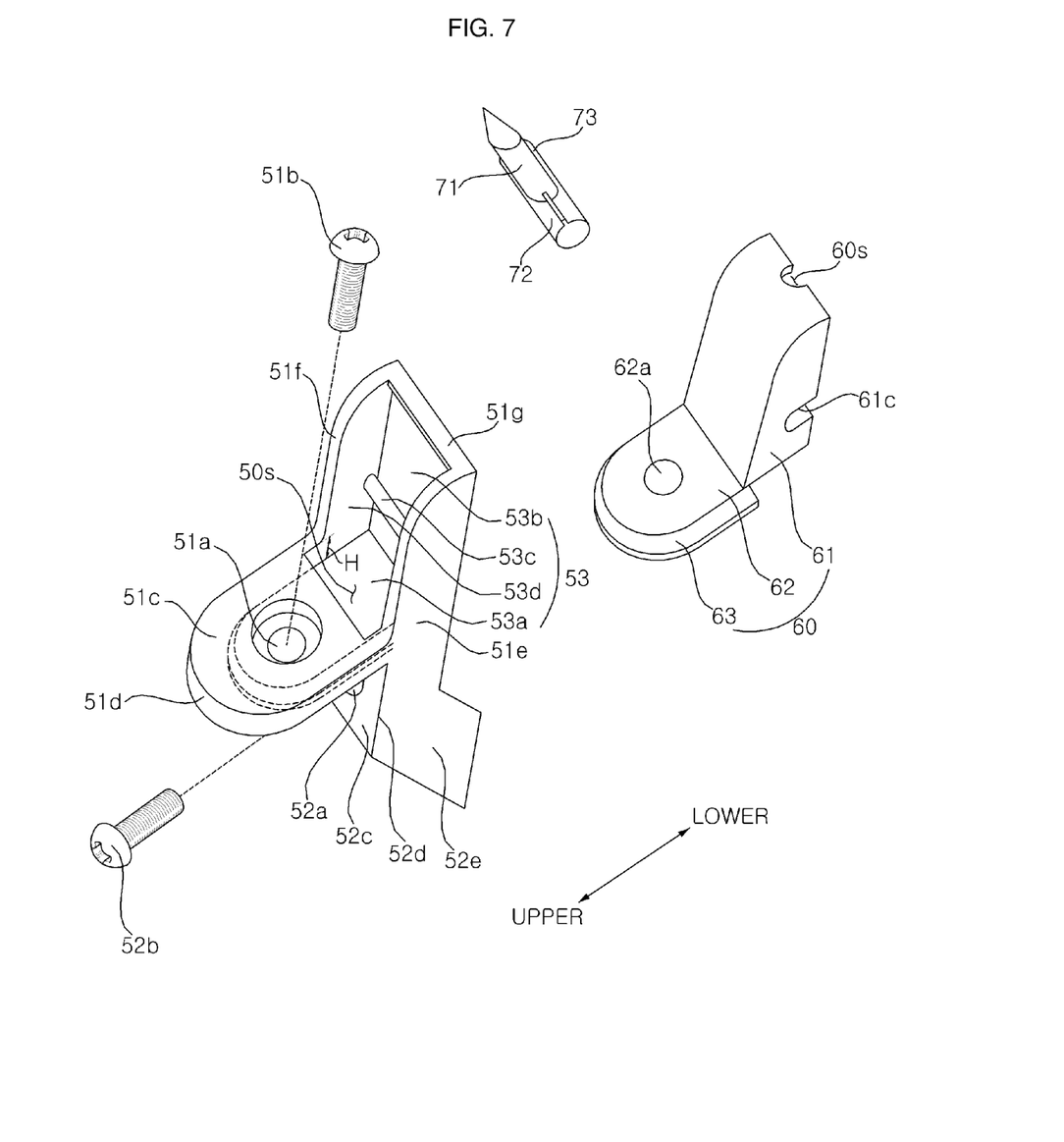
FIG. 7 is an exploded perspective view of a charging device according to an embodiment of the present invention.
Figure 8:
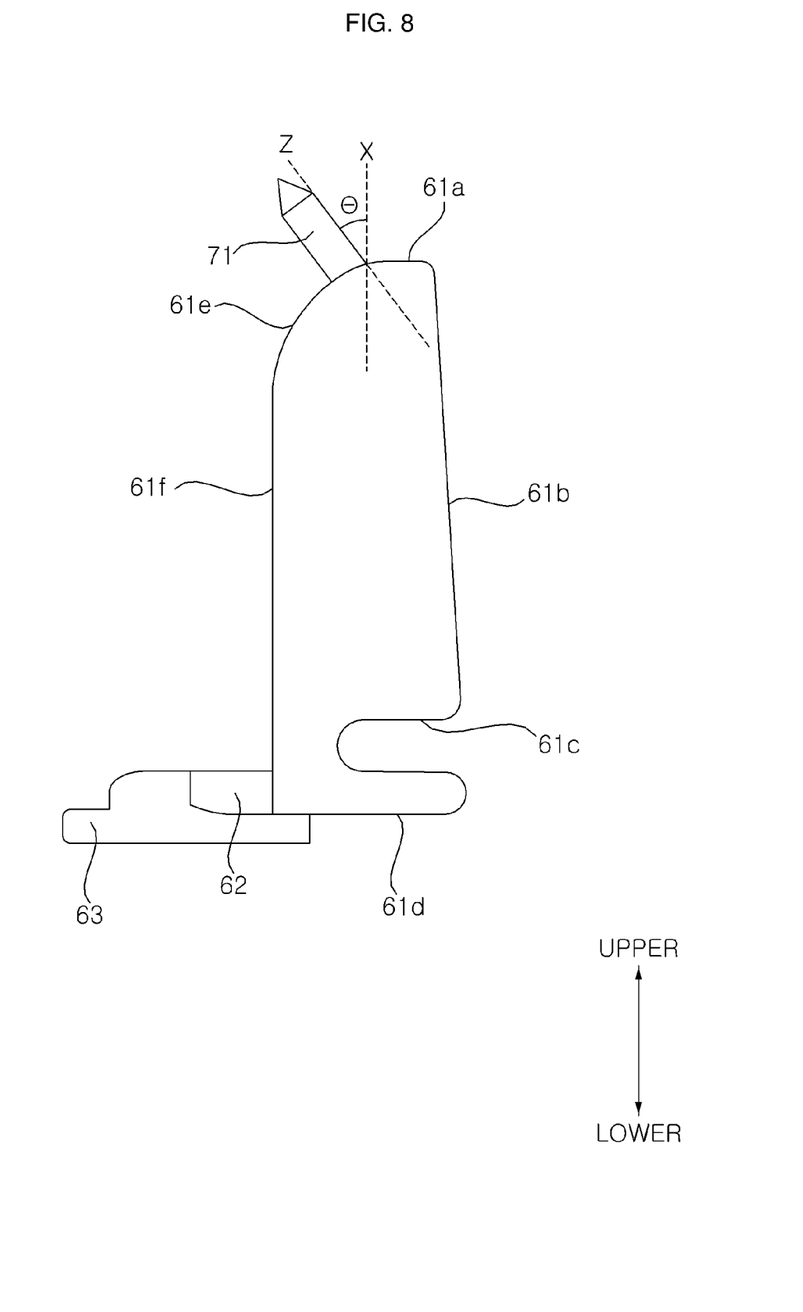
FIG. 8 is a side view of an electrode holder and a discharge electrode according to an embodiment of the present invention.

Hereinafter, a detailed structure of the charging electrode 40 will be described with reference to FIGS. 6 to 8. FIG. 6 shows a state in which the charging electrode 40 is assembled. FIG. 7 shows a state in which the charging electrode 40 is disassembled into a holder case 50, an electrode holder 60, and a discharge electrode 70. FIG. 8 shows the discharge electrode 70 fixed to the electrode holder 60 viewed from the side.

Referring to FIG. 6, the holder case 50 may include a receiving body 51 at least a part of which protrudes toward the panel. The holder case 50 may include a support body 52 connected to the receiving body 51. In the indoor unit 1, the accommodating body 51 may be positioned lower than the support body 52, and the accommodating body 51 and the support body 52 may be integrally formed.

A first hole 51*a* into which the first fastening member 51*b* is inserted may be formed in the receiving body 51. A second hole 52*a* into which the second fastening member 52*b* is inserted may be formed in the support body 52. The first fastening member 51*b* may pass through the first hole 51*a* and the seating frame base 31 to connect the receiving body 51 and the seating frame 30. The second fastening member 52*b* may connect the support body 52 and the seating frame 30 by penetrating the second hole 52*a* and the inner wall 32 of the seating frame. Screws may be used as the first fastening member 51*b* and the second fastening member 52*b*, but the type of fastening members 51*b* and 52*b* is not limited thereto, and magnets or bolts may be used.

The electrode holder 60 may be accommodated inside the accommodating body 51, and the discharge electrode 70 may be fixed to the electrode holder 60 so as to protrude out of the accommodating body 51.

Referring to FIG. 7, the holder case 50, the electrode holder 60, and the discharge electrode 70 may be manufactured as separate components and assembled to each other.

The receiving body 51 may include a first fastening portion 51*c* having a first hole 51*a* formed therein. The receiving body 51 may include a receiving body tip 51*d* extending outward from the first fastening portion 51*c*. The receiving body 51 may include a first seating portion 51*e* extending downward from one end of the first fastening portion 51*c*. The receiving body 51 may include a second seating portion 51*f* extending downward from the other end of the first fastening portion 51*c* and spaced apart from the first seating portion 51*e*. The receiving body 51 may include a third seating portion 51*g* connecting the first seating portion 51*e* and the second seating portion 51*f*.

The first fastening portion 51c can be penetrated through the first fastening member 51b and can be formed to be inclined outwardly and upwardly. The overall outer appearance of the first fastening portion 51c may be an arch shape or may be formed to be rounded outwardly.

The receiving body tip 51d may extend outward from an outer end of the first fastening portion 51c and may be formed to be inclined outwardly upward. Also, the receiving body tip 51d may vertically extend upward from the outer end of the first fastening portion 51c. The overall shape of the receiving body tip 51d may be a horseshoe shape, and the shape of a cross section may be an arc shape or a 'C' shape. The receiving body tip 51d may be formed to surround the outer circumference of the first fastening portion 51c. The receiving body tip 51d may protrude inward from the first fastening portion 51c and be connected to the seating portions 51e, 51f, and 51g and the support body 52.

The first seating portion 51e, the second seating portion 51f, and the third seating portion 51g may extend toward the panel 10 and are integrally formed with each other to support the electrode holder 60. A mounting part" can be configured.

The first seating portion 51e and the second seating portion 51f may extend parallel to each other. The third seating portion 51g may extend perpendicular to the first seating portion 51e and the second seating portion 51f. The third seating portion 51g may form an inner surface of the receiving body 51. The first seating portion 51e and the second seating portion 51f may form one side and the other side of the receiving body 51, respectively.

A space 50s into which the electrode holder 60 is inserted may be formed inside the seating portions 51e, 51f, and 51g. The space 50s may refer to an inner space surrounded by the first seating portion 51e, the second seating portion 51f, and the third seating portion 51g.

The space 50s may be bounded by an upper boundary surface 53a, an inner boundary surface 53b, a floor 53c, one boundary surface 53d, and the other boundary surface (not shown). Movement of the electrode holder 60 may be restricted by the boundary surfaces 53a, 53b, 53c, and 53d. The upper boundary surface 53a, the inner boundary surface 53b, the floor 53c, one boundary surface 53d, and the other boundary surface (not shown) may constitute the boundary surface 53 of the space 50s.

The upper boundary surface 53a may be a lower surface of the receiving body tip 51d. The inner boundary surface 53b may be an outer surface of the third seating portion 51g. The crest 53c may be a protrusion protruding outward from the inner boundary surface 53b. One side boundary surface 53d may be an inner surface of the second seating portion 51f. The other boundary surface (not shown) may be an inner surface of the first seating portion 51e.

The upper boundary surface 53a may be spaced apart from the first fastening portion 51c in the upper and lower directions, and may be formed above the first fastening portion 51c by a predetermined distance H.

The support body 52 may include a second fastening portion 52c extending upward from the receiving body 51. The support body 52 may include a bent portion 52d extending inward from both end portions of the second fastening portion 52c. The support body 52 may include a protrusion 52e extending inwardly from the bent portion 52d.

A second hole 52a into which the second fastening member 52b is inserted may be formed in the second fastening portion 52c, and may extend vertically upward from the receiving body 51. The second fastening portion 52c may be connected to the receiving body tip 51d.

The bent portion 52d may connect the second fastening portion 52c and the protruding portion 52e, and may be formed round.

The protruding portion 52e may extend inwardly from the second fastening portion 52c and may be inclined inwardly and upwardly. An end of the protrusion 52e may come into contact with the outer surface of the inner wall 32 of the seating frame.

The receiving body 51 and the supporting body 52 may be integrally formed to constitute the holder case 50.

The electrode holder 60 may be inserted and fixed into the space 50s of the holder case 50. The electrode holder 60 may include a holder body 61 into which the discharge electrode 70 is inserted. The electrode holder 60 may include a leg 62 connected to an upper portion of the holder body 61. The electrode holder 60 may include a leg tip 63 extending outward from the leg 62.

At least a portion of the holder body 61 may have a curved shape, and an electrode groove 60s into which the discharge electrode 70 is inserted may be formed at a lower portion of the holder body 61. In the holder body 61, a valley 61c recessed outward from the inner surface of the holder body 61 may be formed. The valley 61c may provide a space into which the floor 53c is inserted when inserted into the holder case 50.

The leg 62 may extend outward from the top of the holder body 61 and may have a flat plate-like arch shape. When the leg 62 is inserted into the holder case 50, it may be positioned above the first fastening part 51c and may be fixed to the holder case 50 through the first fastening member 51b. A fixing hole 62a through which the first fastening member 51b passes may be formed in the leg 62. When the leg 62 is inserted into the holder case 50, the fixing hole 62a may communicate with the first hole 51a.

The leg tip 63 may extend outwardly from the leg 62 and may extend from the top of the leg 62. The overall appearance of the leg tip 63 may have a horseshoe shape or a 'C' shape, and may be formed to protrude outward from the end of the leg 62.

The holder body 61, the leg 62, and the leg tip 63 are integrally formed to constitute the electrode holder 60.

The discharge electrode 70 may include a needle 71 to which a high voltage is applied to generate a corona discharge. The discharge electrode 70 may include a pair of keys 72 and 73 supporting the needle 71.

The tip of the needle 71 may have a needle shape. When a high voltage is applied, charges are discharged from the tip of the needle 71, and a corona discharge phenomenon may occur. The needle 71 may be electrically connected to a wire (not shown) extending from the high voltage applying device 8 to receive a high voltage. The needle 71 is made of a conductive material that conducts electricity.

The pair of keys 72 and 73 may extend from the needle 71 in a direction crossing the extending direction of the needle 71. The pair of keys 72 and 73 may be formed symmetrically with respect to the needle 71. The keys 72 and 73 may extend in a direction perpendicular to the needle 71. The keys 72 and 73 may extend from one end of the needle 71 opposite to the other end of the needle 71. The pair of keys 72 and 73 may include a first key 72 and a second key 73. The first key 72 and the second key 73 may have the same shape and extend in opposite directions. The pair of keys 72 and 73 may be made of an insulating material that does not conduct electricity.

Referring to FIG. 8, the needle 71 may be obliquely fixed to the electrode holder 60. The needle 71 may be fixed to the electrode holder 60 while being tilted by a predetermined inclination angle θ with respect to the vertical axis.

The holder body 61 may include an insertion portion 61a in which an electrode groove 60s is formed. The holder body 61 may include a holder inner surface 61b extending upward from the insertion portion 61a. The holder body 61 may include a valley 61c formed to be recessed outward from the holder inner surface 61b. The holder body 61 may include a leg connection portion 61d located on the upper side of the bone 61c. The holder body 61 may include a holder outer surface 61f extending downward from the leg 62. The holder body 61 may include a rounding portion 61e connecting the holder outer surface 61f and the insertion portion 61a.

The needle 71 may be fixed inclined toward the round portion 61e while being received in the electrode groove 60s formed in the insertion portion 61a. The fixed angle θ of the needle 71 may be changed within an angular range from forward downward toward the outer surface 61f of the holder.

Figure 9:
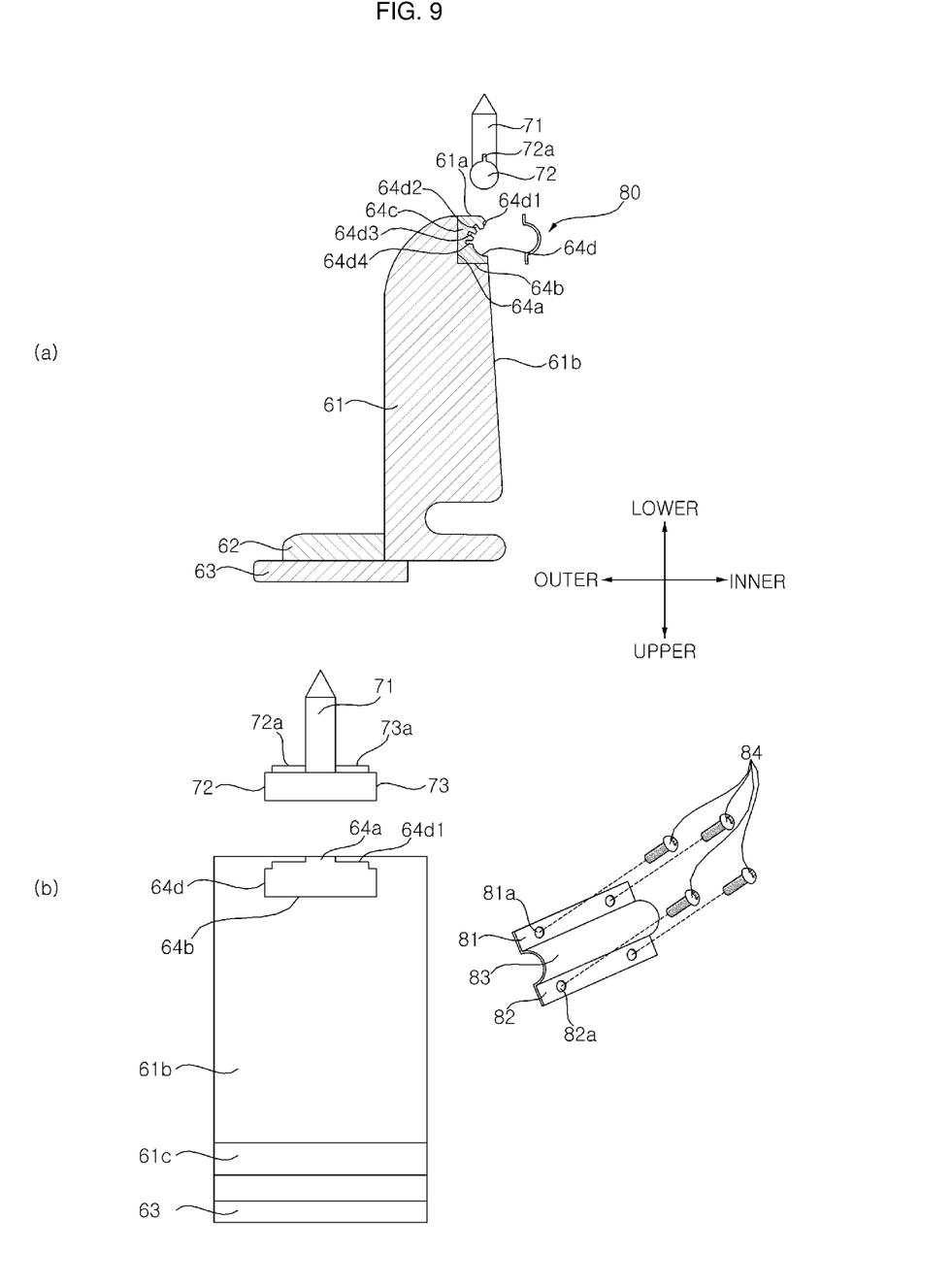

Hereinafter, a structure in which the inclination angle θ of the needle 71 is changed by the electrode holder 60 will be described with reference to FIG. 9. FIG. 9(a) shows a shape in which the electrode holder 60 is cut to expose the electrode groove 60s, and FIG. 9(b) shows a shape in which the electrode holder 60 is viewed from the inside.

The electrode groove 60s may refer to a space opened in the upper and lower directions of the insertion portion 61a. The inner side surface 61b of the holder may be formed by cutting a portion where the electrode groove 60s is formed. The holder inner surface 61b may be formed such that the electrode groove 60s is opened to the inside of the electrode holder 60.

The outer surface 64a of the electrode groove may extend upward from the insertion portion 61a. The upper surface of the electrode groove 64b may extend inward from the upper end of the outer surface of the electrode groove 64a. The electrode groove side surface 64c may extend upward from the insertion portion 61a to intersect the electrode groove outer surface 64a. The keyhole 64d may be formed to be recessed from the electrode groove side surface 64c. The electrode groove 60s may be bounded by an electrode groove outer surface 64a, an electrode groove upper surface 64b, an electrode groove side surface 64c, and a keyhole 64d.

The keyhole 64d may be formed to be recessed from each of the pair of electrode groove side surfaces 64c extending inward from both ends of the electrode groove outer surface 64a. The pair of keyholes 64d may extend in opposite directions. The inner portion of the keyhole 64d is open, and when the electrode holder 60 is viewed from the inside, the structure of the keyhole 64d may be exposed.

A first protrusion 72a protruding in a direction parallel to the needle 71 may be formed on the first key 72 supporting the needle 71. Similarly, a second protrusion 73a protruding in a direction parallel to the needle 71 may be formed on the second key 73 extending in a direction opposite to the first key 72. The first protrusion 72a and the second protrusion 73a may have the same shape and protrude in the same direction.

A plurality of protrusion insertion portions 64d1, 64d2, 64d3, and 64d4 into which the first protrusion 72a and the second protrusion 73a are inserted may be formed in the keyhole 64d. The plurality of protrusion insertion portions 64d1, 64d2, 64d3, and 64d4 may be spaced apart from each other in a circumferential direction of the keyhole 64d. A spaced angle between the protrusion insertion portions 64d1, 64d2, 64d3 and 64d4 may be constant.

The number of protrusion insertion portions 64d1, 64d2, 64d3, and 64d4 may be four. The protrusion insertion portions 64d1, 64d2, 64d3, and 64d4 may be divided, from the lower side toward the upper side, the first projection insertion portion 64d1, the second projection insertion portion 64d2, the third projection insertion portion 64d3, and a fourth protrusion insertion portion 64d4. However, the number or division of the protrusion insertion portions 64d1, 64d2, 64d3, and 64d4 is not limited to the above.

The first protrusion insertion portion 64d1 may be formed to be recessed in a direction parallel to the upper and lower axes, and may have an angle of 0 degrees with the upper and lower axes. The second protrusion insertion portion 64d2 may be formed to be recessed at an angle of 30 degrees with the upper and lower shafts. The third protrusion insertion portion 64d3 may be formed to be recessed at an angle of 60 degrees with respect to the upper and lower shafts. The fourth protrusion insertion portion 64d4 may be formed to be recessed so that an angle with the upper and lower shafts is 90 degrees. However, the angle between each of the protrusion insertion portions 64d1, 64d2, 64d3, and 64d4 and the upper and lower axes is not limited to the above and may be modified in various embodiments.

The angle formed by the discharge electrode 70 with the vertical axis may be changed depending on which projection inserting portion 64d1, 64d2, 64d3, or 64d4 the first projection 72a or the second projection 73a is inserted into. For example, when the protrusion 72a is inserted into the first protrusion insertion portion 64d1, the discharge electrode 70 may form an angle of 0 degrees with respect to the vertical axis. When the protrusion 72a is inserted into the second protrusion insertion portion 64d2, the discharge electrode 70 may form an angle of 30 degrees with respect to the vertical axis. When the protrusion 72a is inserted into the third protrusion insertion portion 64d3, the discharge electrode 70 may form an angle of 60 degrees with respect to the vertical axis. When the protrusion 72a is inserted into the fourth protrusion insertion portion 64d4, the discharge electrode 70 may form an angle of 90 degrees with respect to the vertical axis.

An electrode cap 80 connected to the electrode holder 60 and supporting the discharge electrode 70 inserted into the electrode groove 60s may be disposed inside the electrode holder 60.

A fence 83 extending parallel to the extending direction of the keys 72 and 73 may be formed on the electrode cap 80. The fence 83 may be formed in a semicircular shape, and may be formed to be rounded to the outside of the electrode holder 60. The fence 83 may come into contact with the keys 72 and 73 when the electrode cap 80 is fixed to the electrode holder 60. The fence 83 can prevent the keys 72 and 73 from coming out of the electrode holder 60.

A first fixing plate 81 extending from one end of the fence 83 to one side may be formed on the electrode cap 80. A second fixing plate 82 extending from the other end of the fence 83 to the other side may be formed on the electrode cap 80. The first fixing plate 81 and the second fixing plate 82 may be symmetrically formed with respect to the fence 83. The first fixing plate 81 and the second fixing plate 82 may extend by the same length in a direction parallel to the fence 83.

A first through hole 81a into which a predetermined fixing member 84 is inserted may be formed in the first fixing plate 81. A second through hole 82a into which a predetermined fixing member 84 is inserted may be formed in the second fixing plate 82. A plurality of first through holes 81a may be formed to be spaced apart in the longitudinal direction of the first fixing plate 81. A plurality of second through holes 82*a* may be formed to be spaced apart in the longitudinal direction of the second fixing plate 82.

The fixing member 84 may be inserted into each of the through holes 81*a* and 82*a* to fix the electrode cap 80 to the electrode holder 60. A screw may be used as the fixing member 84, but the type of fixing member 84 is not limited thereto, and other members capable of fixing the electrode cap 80 to the electrode holder 60 may be used.

When the electrode cap 80 is fixed to the electrode holder 60 through the fixing member 84 in a state where the discharge electrode 70 is inserted into the electrode groove 60*s*, the electrode cap 80 may support the discharge electrode 70 by compression. Accordingly, the discharge electrode 70 is not separated from the electrode groove 60*s*.

In order to change the angle formed by the discharge electrode 70 and the upper and lower axes, the projections 72*a* and 73*a* may be inserted into the projection insertion portions 64*d*1, 64*d*2, 64*d*3, and 64*d*4 corresponding to the angular positions to be changed. Then, the angle of the discharge electrode 70 can be adjusted by fixing the electrode cap 80 to the electrode holder 60.

The holder case 50, the electrode holder 60, and the discharge electrode 70 may be assembled to be separable from each other, and may be assembled to form the charging device 40. The charging device 40 may be detached from the seating frame 30 or the dust collecting frame 21. After separating only the charging device 40 from the electric dust collector 20 and adjusting the angle of the discharge electrode 70, the angle-adjusted discharge electrode 70 may be coupled to the electric dust collector 20 again.

Figure 10:
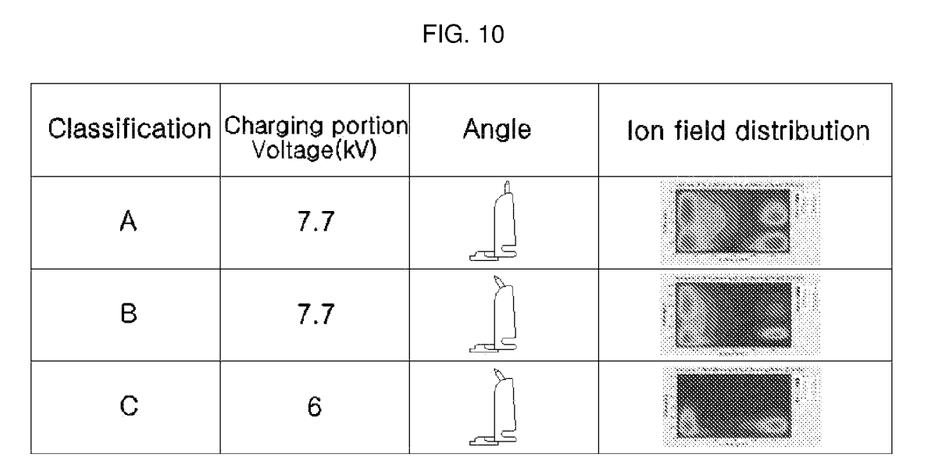
FIG. 10 is a table showing operational effects according to an embodiment of the present invention.
Figure 11:
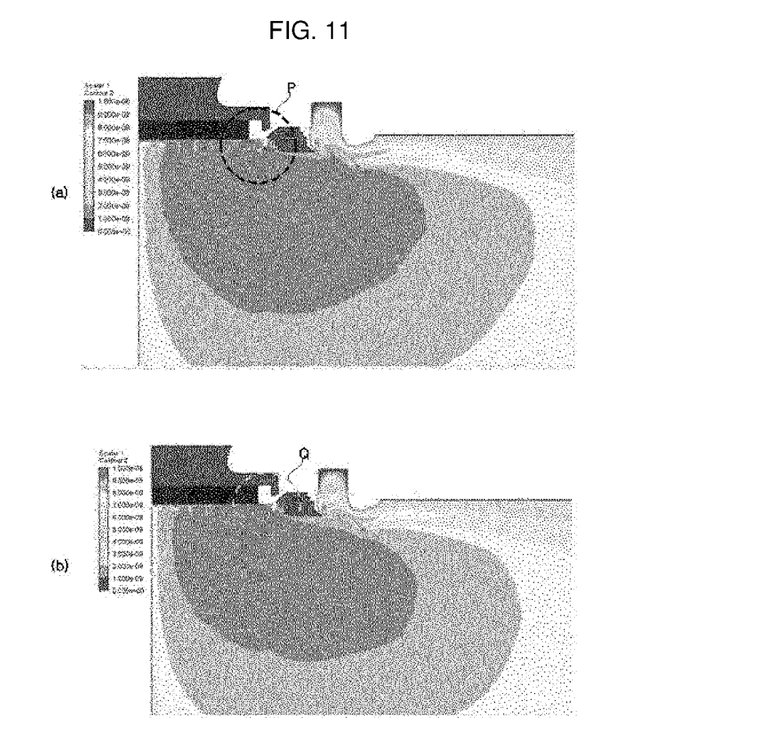
FIG. 11 is a contour showing operational effects according to an embodiment of the present invention.

Hereinafter, the dust collection efficiency of the electric dust collector 20 according to an embodiment of the present invention will be described with reference to FIGS. 10 and 11. FIG. 10 compares the distribution of ion fields in a table with the angle formed between the discharge electrode 70 and the vertical axis and the intensity of the voltage applied to the discharge electrode 70 as variables. FIG. 11(*a*) shows the ion field distribution when the discharge electrodes 70 are arranged parallel to the air flow direction as a contour. FIG. 11(*b*) shows the ion field distribution as a contour when the discharge electrode 70 is tilted by 30 degrees with respect to the air flow direction.

Referring to FIG. 10, in the first experimental example A, a voltage of 7.7 kV is applied, and the discharge electrodes 70 are arranged parallel to the air flow direction. In the second experimental example B, a voltage of 7.7 kV is applied, and the discharge electrode 70 is arranged to be inclined outward at an angle of 30 degrees to the air flow direction. In the third experimental example C, a voltage of 6 kV is applied, and the discharge electrode 70 is disposed so as to be inclined outward at an angle of 30 degrees to the air flow direction.

Comparing the first experimental example A and the second experimental example B, the ion field distribution is more widely distributed in the first experimental example A, and the amount of ions generated is also greater in the first experimental example A. This means that, in the case of the first experimental example A, an excessive amount of ions is supplied and the amount of residual ions is increased, thereby reducing the dust collection efficiency in the dust collecting unit. Therefore, it may be preferable that the discharge electrode 70 be disposed at an angle of 30 degrees to the flow direction for the purpose of improving dust collection efficiency by reducing the amount of residual ions.

Referring to FIG. 11, in the case in which the discharge electrodes 70 are disposed parallel to the flow direction (FIG. 11(*a*)), Compared to the case in which the discharge electrodes 70 are disposed at an angle of 30 degrees with the flow direction (FIG. 11(*b*)), the ion field distribution is wider and the amount of generated ions is larger. Therefore, it may be preferable that the discharge electrode 70 be disposed at an angle of 30 degrees to the flow direction for the purpose of improving dust collection efficiency by reducing the amount of residual ions.

In addition, comparing the area P near the discharge electrode 70 in FIG. 11(*a*) and the area Q near the discharge electrode 70 in FIG. 11(*b*), since there is an ion field distribution that is dispersed to the outside of the panel 10 in the neighboring area Q shown in FIG. 11(*b*), an ions charged by the discharge electrode 70 may be dispersed to the outside of the indoor unit 1. Accordingly, the amount of residual ions collected by the dust collector can be reduced.

In the above, the preferred embodiment of the present invention has been shown and described, but the present invention is not limited to the specific embodiment described above, various modifications can be made by those skilled in the art without departing from the subject matter of the present invention claimed in the claims, and these modifications should not be understood individually from the technical spirit or perspective of the present invention.

The invention claimed is:

1. An air conditioner, comprising:
   a case that forms an exterior of the air conditioner;
   a panel having an air inlet and disposed at one side of the case;
   an electric dust collector that collects foreign substances introduced through the air inlet; and
   a high voltage applying device electrically connected to the electric dust collector, wherein the electric dust collector includes:
   a discharge electrode that extends toward the air inlet and charges particles contained in air introduced through the air inlet; and
   an electrode holder that supports the discharge electrode so that an angle formed between an extension direction of the discharge electrode and a flow direction of air introduced through the air inlet is changeable, wherein the discharge electrode comprises:
   a needle that receives a high voltage from the high voltage applying device; and
   a pair of keys that supports the needle, wherein the pair of keys include a first key and a second key, wherein the first key and the second key have a same shape and extend in opposite directions, and wherein the needle is obliquely fixed to the electrode holder.

2. The air conditioner according to claim 1, wherein the discharge electrode obliquely extends outward from the panel.

3. The air conditioner according to claim 1, wherein the electrode holder is open toward the air inlet and has an electrode groove in which the discharge electrode is accommodated.

4. The air conditioner according to claim 1, wherein the electrode holder has a keyhole into which the discharge electrode is inserted.

5. The air conditioner according to claim 1, wherein the electrode holder has a valley formed in a direction crossing the extension direction of the discharge electrode.

6. The air conditioner according to claim 1, wherein the electrode holder comprises:
   an electrode body in which the discharge electrode is accommodated; and
   a leg connected to an upper side of the electrode body.

7. The air conditioner according to claim 6, wherein the electrode holder includes a leg tip connected to an upper side of the leg.

8. The air conditioner according to claim 6, wherein the leg protrudes outward as the leg extends upward.

9. The air conditioner according to claim 1, wherein the electric dust collector includes an electrode cap that is connected to the electrode holder and supports the discharge electrode.

10. The air conditioner according to claim 9, wherein the electrode cap has a fence protruding outward from the electrode holder.

11. The air conditioner according to claim 1, wherein the electric dust collector includes a holder case in which the electrode holder is seated.

12. The air conditioner according to claim 11, wherein the electric dust collector comprises:
    a dust collection unit that collects foreign substances introduced through the air inlet; and
    a seating frame that is disposed outside of the dust collecting unit and supports the holder case.

13. The air conditioner according to claim 11, wherein the holder case comprises:
    a receiving body at least a portion of which protrudes toward the panel; and
    a support body connected to the receiving body.

14. The air conditioner according to claim 11, wherein the holder case has a crest inserted into a valley formed on one side of the electrode holder.

* * * * *